US009113376B2

(12) United States Patent
Hromoko et al.

(10) Patent No.: US 9,113,376 B2
(45) Date of Patent: Aug. 18, 2015

(54) MULTI-INTERFACE MOBILITY

(75) Inventors: Ron Hromoko, San Diego, CA (US);
Kevin Shatzkamer, Hingham, MA
(US); Klaas Wierenga, Utrecht (NL);
Steven Braaten, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 13/315,345

(22) Filed: Dec. 9, 2011

(65) Prior Publication Data

US 2013/0152175 A1    Jun. 13, 2013

(51) Int. Cl.
*H04L 9/32*         (2006.01)
*G06F 15/16*        (2006.01)
*H04W 36/00*        (2009.01)
*H04W 88/06*        (2009.01)

(52) U.S. Cl.
CPC .......... *H04W 36/0011* (2013.01); *H04W 88/06* (2013.01)

(58) Field of Classification Search
CPC . H04L 63/0823; H04L 63/0838; H04L 45/00; H04L 45/60
USPC .......... 726/2, 5; 713/150, 156, 172, 182, 185
See application file for complete search history.

(56) References Cited

U.S. PATENT DOCUMENTS 7,599,323 B2 * 10/2009 Chandranmenon et al. .. 370/328
8,370,899 B2 *  2/2013 Shoval et al. ..................... 726/2
2006/0177016 A1 *  8/2006 Gallick et al. ............... 379/67.1
2008/0086764 A1 *  4/2008 Kulkarni et al. .................. 726/7
2011/0231670 A1 *  9/2011 Shevchenko et al. ......... 713/189

OTHER PUBLICATIONS

IEEE Dictonary 7th Edition 2000; p. 872; Definition of Processor.*
A study on the two-channel authentication method which provides two-way authentication in the Internet banking environment, You et al, IEEE 2010.*
DaTA—Data—Transparent Authentication Without Communication Overhead, Chen et al, IEEE, 2006.*
http://hitachi-id.com/solutions/cloud-integrations.html Sep. 6, 2011, Hitachi ID Systems, Inc., Cloud Integrations, (7 pages).

* cited by examiner

*Primary Examiner* — Luu Pham
*Assistant Examiner* — Jahangir Kabir
(74) *Attorney, Agent, or Firm* — Edell, Shapiro & Finnan, LLC

(57) ABSTRACT

Techniques for providing access to cloud services via a plurality of different network interfaces of a client device. In accordance with one example, during establishment of a communication session between the cloud computing system and the client device, an interface-independent identifier is provided to the client device via a first of the plurality of different network interfaces. Following determination to establish the communication session via the second network interface, the cloud computing system is configured to maintain a virtual environment associated with the communication session for a period of time. A message is received, via a second of the plurality of different network interfaces, from the client device that includes the interface-independent identifier. In response to the received interface-independent identifier, the communication session is re-established with the client device via the second network interface, thereby enabling access to the virtual environment maintained by the cloud computing system.

23 Claims, 6 Drawing Sheets

MULTI-INTERFACE MOBILITY

TECHNICAL FIELD

The present disclosure relates to a communication session between a client device and a cloud computing system.

BACKGROUND

Cloud computing refers to a type of computing architecture in which scalable and virtualized computing resources are provided to customers over a Wide Area Network (WAN) (e.g., the Internet). A computing cloud typically comprises a system of multiple computers or servers (physical and/or virtual) connected by a high-speed network, such as a local area network (LAN). Certain servers in the cloud computing system host one or more services that may be accessed by the customers on an as-needed basis.

A user generally accesses the services hosted by the cloud servers via a client device, such as a computer (desktop, laptop, etc.,) or a mobile device (phone, tablet, etc.). This access occurs through the creation of a communication session between the client device and a management or administrative server in the cloud computing system.

DESCRIPTION OF EXAMPLE EMBODIMENTS

Overview

Techniques are provided for access to cloud services via a plurality of different network interfaces of a client device. In accordance with one example, during establishment of a communication session between the cloud computing system and the client device, an interface-independent identifier is provided to the client device via a first of the plurality of different network interfaces. Following determination to establish the communication session via a second of the plurality of network interfaces, the cloud computing system is configured to maintain a virtual environment associated with the communication session for a period of time. A message is received from the client device, via the second network interface, and includes the interface-independent identifier. In response to the received interface-independent identifier, the communication session is established with the client device via the second network interface, thereby enabling access to the virtual environment maintained by the cloud computing system via the second network interface.

Example Embodiments

Figure 1:
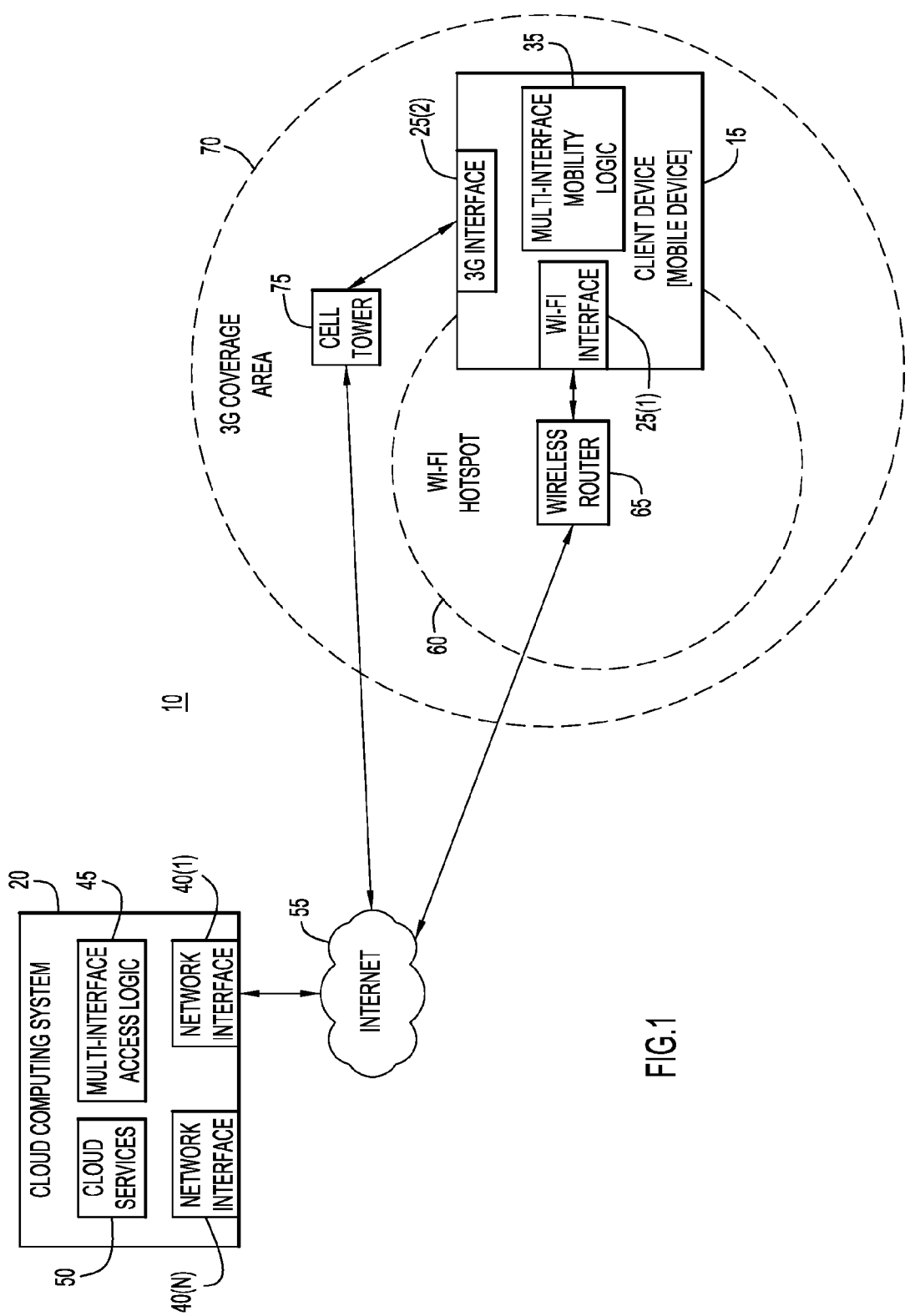
FIG. 1 is block diagram of a communication network in which a client device is configured to access cloud services using multiple-interface mobility techniques.

FIG. 1 is a block diagram of a communication network 10 in which a client device 15, such as a computer (desktop, laptop, etc.,) or a mobile device (phone, tablet, etc.), establishes a communication session with a cloud computing system 20. In this example, client device 15 comprises multiple network interfaces, namely a Wi-Fi interface 25(1) and a 3rd generation (3G) mobile telecommunications interface 25(2). Client device 15 also comprises multi-interface mobility logic 35. Cloud computing system 20 comprises a plurality of network interfaces 40(1)-40(N), multi-interface access logic 45, and one or more servers (not shown in FIG. 1) hosting cloud services 50.

Client device 15 (or a user at client device 15) desires to access the cloud services 50 of cloud computing system 20. This access is enabled through the establishment of a communication session between cloud computing system 20 and client device 15 via the Internet 55. In this example, client device 15 has multiple wireless interfaces (e.g., Wi-Fi interface 25(1) and 3G interface 25(2)) that may be used to access the Internet 50 and establish a communication session. The availability (connectivity) of these wireless interfaces for connection to the Internet 55 depends, in part, on the proximity of the client device 15 to the respective wireless access points. As schematically shown in FIG. 1, client device 15 is located at the edge of a Wi-Fi hotspot 60 created by a wireless router 60. Client device 15 is also within 3G coverage area 70 provided by cell tower 75. As such, client device 15 may be able to access the Internet 55 (and thus establish the communication session with cloud computing system 20) through Wi-Fi interface 25(1), depending on the strength of the Wi-Fi coverage, or through 3G interface 25(2).

Generally, access to the Internet 55 through a Wi-Fi connection has several advantages when compared to use of a 3G connection. For example, a Wi-Fi connection will typically be faster than a 3G connection and, in the context of mobile phones, using a Wi-Fi connection allows the user to place/receive calls on the 3G network. Similarly, free Wi-Fi connections are available at numerous locations, such as coffee shops, libraries, schools, etc. Therefore, in the example of FIG. 1, client device 15 initially establishes a communication session with cloud computing system 20 via Wi-Fi interface 25(1) (i.e., through wireless router 65).

As used herein, a communication session comprises a consistent flow of data between client device 15 and cloud computing system 20. In one example, the communication session is a Transmission Control Protocol (TCP) session. As described further below, a virtual environment is created in the cloud computing system 20 that enables access to cloud services 50. Also described further, a communication session may be "established" at one interface and subsequently accessed or re-established at the same or a different interface.

Because the client device 15 is at the edge of Wi-Fi hotspot 60, the strength of the Wi-Fi signal may become weak. In certain cases, the Wi-Fi signal may become sufficiently weak such that the connectivity of the Wi-Fi interface 25(1) is lost. In conventional systems, when connectivity at a first interface, such as Wi-Fi interface 25(1), is lost, the client device 15 will attempt to re-connect to cloud computing system 20 via a second interface, such as 3G interface 25(2), if such an interface is available. However, this change in the interfaces, referred to herein as interface switchover, may result in a new Internet Protocol (IP) address for the client device 15. When a user is authenticated to a cloud computing system that relies on a communication session (e.g., TCP session, application keep alive) staying active for the life of the accessed services, changing the IP address of either the source or destination results in teardown (i.e., termination) of the communication session. As such, re-establishment of a communication session using the new source IP is treated, by both endpoints (cloud computing system 20 and client device 15), as a new communication session, and resumption of the terminated communication session is not possible.

Furthermore, following a detected loss of connectivity (i.e., teardown of communication session), cloud computing system 20 may choose to immediately free-up resources by terminating and tearing down the virtual environment that was used during the communication session to access cloud services 50. When the virtual environment is torn down, the cloud computing system 20 performs several internal operations (e.g., writes state of virtual environment to a database, notifies an authenticator in the communication session of the teardown, etc.) and sends a communication session termination message to the client device 15 (which may or may not be received/acknowledged).

As a result of the above communication session/virtual environment teardown (i.e., termination), all future communication sessions between the client device 15 and cloud computing system 20, on the Wi-Fi interface 25(1) or any other interface, such as 3G interface 25(2), require full re-authentication. Additionally, the user must re-open any applications and a total rebuild of the virtual environment is needed.

The communication session teardown and the need for the creation of a new virtual environment creates a number of problems including, unnecessary use of cloud computing system resources for the teardown of the virtual environment, unnecessary use of client device resources for re-authentication after completing a switchover to a new interface, and unnecessary use of cloud computing system resources to re-establish the virtual environment to the state it was pre-switchover. Additionally, if a user is an area where their interfaces keep changing (i.e., at the edge of a Wi-Fi hotspot where coverage is low), repeated attempts to establish a new communication session and a new virtual environment may inadvertently cause a denial-of-service (Dos) attack against the cloud operator and place undue burden on the user (continuous web logins, long delays in resuming work, etc.)

Techniques provided herein are generally directed to enabling interface switchover without causing communication session/virtual environment teardown in a cloud computing environment. In other words, in accordance with techniques described herein, a seamless change in the interface used by a client device for access to a cloud computing system is possible, thereby allowing a user to continue the same communication session (and use the same virtual environment) after loss of connectivity at a first interface or other determination to change interfaces. This seamless interface switchover is referred to herein as multi-interface mobility, and, in the example of FIG. 1, is enabled by multi-interface mobility logic 35 in client device 15 and by multi-interface access logic 45 in cloud computing system 20. Further details of multi-interface mobility logic 35 and multi-interface access logic 45 are provided below.

The above examples have been primarily described with interface switchover as a result of loss of connectivity at an interface. However, it is to be appreciated that interface switchover may also occur for other reasons. For example, if data rates or link quality reach a sub-optimal level, a decision could be made to switch interfaces (i.e., implement interface switchover). It is also to be appreciated that interface switchover may include activating one or more interfaces without deactivating a current interface.

As described below, one or more elements are configured to make a determination to implement interface switchover. The determination to implement interface switchover may occur, for example, by detecting a loss of connectivity at an interface, detecting that data rates or link quality are below an acceptable threshold level, determining to load share on a second interface, etc. For ease of illustration, examples will be primarily described herein with reference to implementing interface switchover as a result of loss of connectivity at an interface.

Figure 2:
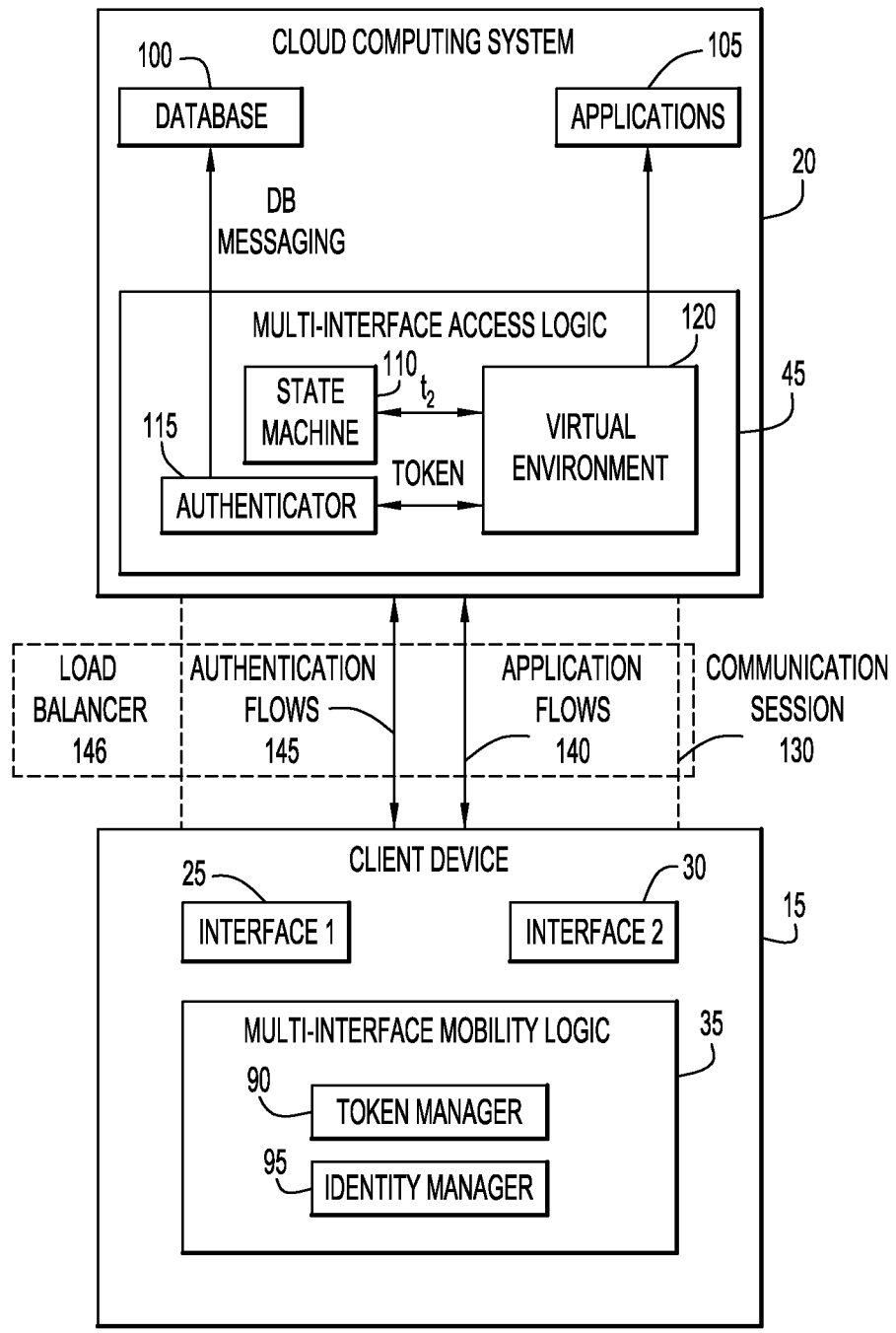
FIG. 2 is a block diagram of the client device and a cloud computing system configured to implement multiple-interface mobility techniques.

FIG. 2 is a functional block diagram illustrating further details of the multi-interface mobility techniques described herein. For ease of illustration, client device 15 and cloud computing system 20 are shown in FIG. 2. A load balancer 146, which may be used in certain examples, as described below, is also shown in FIG. 2. Because the use of load balancer 146 occurs only in specific examples, it is shown using a hashed/dotted line.

Client device 15 comprises a first interface 25(1), a second interface 25(2), and multi-interface mobility logic 35. Multi-interface mobility logic 35 comprises two functional blocks shown as token manager 90 and identity manager 95. Cloud computing system 20 comprises one or more network interfaces (shown in FIG. 2), multi-interface access logic 45, a database 100, and applications 105. Database 100 and applications 105 are each hosted on one or more servers (not shown in FIG. 2). Multi-interface access logic 45 comprises three functional blocks shown as state machine 110, authenticator 115, and virtual environment 120.

As noted above, interface 25(1) may be a Wi-Fi interface and interface 25(2) may be a 3G interface. It is to be appreciated that the use of a Wi-Fi interface in combination with a 3G interface is merely illustrative, and that the first and second interfaces may be any other interface now known or later developed including, but not limited to, IEEE 802.11, IEEE 802.16 (WiMAX), Bluetooth, fixed line, Long Term Evolution (LTE), etc., and these interfaces may be used in any combination. Other interfaces could also be added in alternative examples.

Generally, multi-interface access logic 45 and multi-interface mobility logic 35 cooperate to create (establish) a communication session 130 between client device 15 and cloud computing system 20 for use in accessing the cloud services (e.g., applications 105). As defined herein, multi-interface access logic 45 and multi-interface mobility logic 35 may each embody functionality that enables the conventional establishment of the communication, as well as new functionality that enables the multi-interface mobility. It is to be appreciated that the groupings of functionality and elements of FIG. 2 is merely for purposes of illustration and is not intended to reflect actual groupings implemented in practice or in alternative arrangements.

In cloud computing system 20, the virtual environment 120 is the presentation to the user at client device 15. This generally comprises an operating system (OS) such as Windows, Linux, etc. Virtual environment 120 may also comprise an application list based on an identity profile. Authenticator 115 is functionally responsible for allowing access to the virtual environment 120, and retrieving any past state of the virtual environment based on identity. This includes: credential validation/authentication (user name/password), identity profile (applications, last known state), and communication with virtual environment 120 for creation of the environment based on the identity profile.

As noted above, a communication session, such as communication session 125(2), comprises a consistent flow of data between client device 15 and cloud computing system

20. This flow may comprise application flows 140 and authentication flows 145, including keep-alive mechanisms (e.g., time-based, challenge-response, etc.) that, as described below, are independent of the interface originally used for authentication.

The state machine 110 functionally is responsible for maintaining the state of virtual environment 120 and monitoring received keep-alive messages (called "keep-alives"). Additionally, cloud computing system 20 establishes a timer ($t_1$) which represents the maximum allowed interval between keep-alives. When a keep-alive is received, timer $t_1$ is reset.

If $t_1$ expires, the state machine 110 triggers the virtual environment 120 to be torn down. As noted above, if the virtual environment 120 is torn down, the cloud computing system 20 writes the state of virtual environment to database 100, notifies authenticator 115 of the communication session teardown, and sends a communication session termination message to the client device 15.

In accordance with the multi-interface mobility techniques described herein, following interface switchover, the client device 15 and cloud computing system 20 re-establish (i.e., access) the same communication session (e.g., TCP session). In order for this to occur, the cloud computing system 20 is configured to prevent tear down of the virtual environment 120 (i.e., maintain the virtual environment) That is, the same communication session can only be re-established or accessed if the client device 15 can be re-connected to the same virtual environment. If the virtual environment is not maintained, full re-authentication of the user (i.e., re-entering username/password, etc.) would be needed in order to create a new virtual environment (i.e., to obtain identity profile and other information). However, if desired for security reasons, re-authentication of the user may still be utilized as an optional security feature In order to maintain the virtual environment 120, the multi-interface access logic 45 is configured to maintain a configurable timer ($t_2$) that maintains the state of the virtual environment during non-communicative periods, for a set amount of time. More specifically, authenticator 115 assigns the "handoff window" timer $t_2$ to the state machine 110. If $t_1$ expires, the state machine 110 initiates the timer $t_2$ during which time the virtual environment is maintained. While $t_2$ is running, $t_1$ is irrelevant. If both $t_1$ and $t_2$ expire, the state machine 110 triggers for the virtual environment 120 to be torn down. By retaining the state of virtual environment 120 in order to provide persistent access to cloud services independent of network interface connection status, following interface switchover client device 15 can be reconnected to the same virtual environment using the same communication session.

When client 15, which multiple interfaces 25(1) and 25(2), first establishes a communication session with cloud computing system 20, the client device authenticates to the cloud domain using a standard identity. This initial authentication may be enabled by identity manager 95. This identity may be proven, for example, using a username/password, or other mechanism. During establishment, of the communication session, authenticator 115 assigns a pseudo-identity token to client device 15. This token is independent of network-layer interface information (IP address) of the interface on the client device that was used to establish the communication session. That is, the token is not tied to any specific interface and is sometimes referred to herein as an interface-independent identifier. In FIG. 2, the token is part of authentication flows 145.

The interface-independent identifier issued to client device 15 may be used, for a predetermined period of time, by the client device for future authentication to cloud computing system 20. That is, the identifier is generated/assigned by authenticator 115 such that it is valid only for a fixed period of time. By providing a time-limited identity that is not tied to network-layer interface information (i.e., network interface independent and instead identifies the application to the back-end network), fast-re-authentication and retrieval of virtual environment state can be conducted on different interfaces without any intervention by the user. When the maintenance of the virtual state is combined with the interface-independent identifier, following an interface switchover, a user can re-access the same virtual environment, within a time period and without any manual intervention, thereby allowing for break-before-make interface handovers to occur.

As noted above, keep-alives (time-based, challenge-response) that are independent of the interface originally used for authentication may be sent to cloud computing system 20. If a subsequently-sent keep-alive message is replied to, or if a client-initiated keep-alive message is received, by the cloud computing system 20, from any source, containing the token assigned during initial authentication, both $t_1$ and $t_2$ are reset.

In one example of FIG. 2, client device 15 establishes the communication session 130 with cloud computing system 20 via interface 25(1), resulting in the creation of virtual environment 120. Authenticator 115 issues an interface-independent identifier (pseudo-identity token) to client device 15. Token manager 90 then stores this identifier for subsequent use.

Subsequently, a determination is made to re-establish or access the previously created communication session 130 via the second interface 25(2). For example, in circumstances, a determination may be made that interface 25(1) has lost connectivity, thereby terminating the communication session 130. However, in this example, it is determined at client device 15 that connectivity is still available at interface 25(2) via a different mechanism (i.e., different type of wired or wireless connection). As such, upon moving to this new interface (with a different IP address), client device 15 sends a message to cloud computing system 20, via interface 25(2), that includes the pseudo-identity token. This message may be either a bearer message (TCP header option) or an authentication message. This transmission is enabled by token manager 90. The cloud computing system 20, and more specifically authenticator 115, validates the viability of the pseudo-identity token to, for example, ensure that the token has not expired (i.e., that it has been received within the predetermined time period). Authenticator 115 then allows re-establishment of the same communication session without forcing any re-authentication to occur.

As noted above, client device 15 has multiple interfaces. In certain circumstances, all of the interfaces may be available (i.e., have connectivity), but one interface may be preferred due to, for example, better data rates, better link quality, etc. In such examples, the determination to re-establish or access the communication session 130 via the second interface 25(2) refers to a determination that second interface 25(2) is preferred; even though the first interface 25(1) is still available. The determination to re-establish or access the communication session 130 via the second interface 25(2) may result from client 15 sending a message (bearer message or an authentication message) to cloud computing system 20, via interface 25(2), which includes the pseudo-identity token. This functions as an indication to cloud computing system 20 that client device 15 has a backup, or an alternative, interface for both sending and receiving traffic, and that the client device 15 wishes to use second interface 25(2) exclusively or to load-share traffic across the multiple interfaces. As such, cloud computing system 20 is configured to establish the communication session with the second interface 25(2).

As previously noted, certain examples use a load balancer 146. In these examples, load balancer 146 is provided to process authentication flows 145 and authentication flows 140 and to load-share multiple physical machines. In such circumstances, re-established communication session should be directed to the same physical machine in the cloud computing system 20. As such, the load balancer 146 is configured to retain a timer that is similar to $t_2$ so that, during the time frame, traffic is re-directed back to the same server interface. More specifically, a timer (e.g., timer $t_2$), rather than being used to prevent communication session tear-down, is used to maintain an indicator of where (e.g., which interface) traffic between the client and server should be sent during the time frame. The indicator is similar to the token, and is provided to the load balancer 146 at start-up. This functionality (i.e., similar token-awareness, identity-awareness, and time functionality as described above) may be enabled by one or both of multi-interface access logic 45 and multi-interface mobility logic 35.

Figure 3:
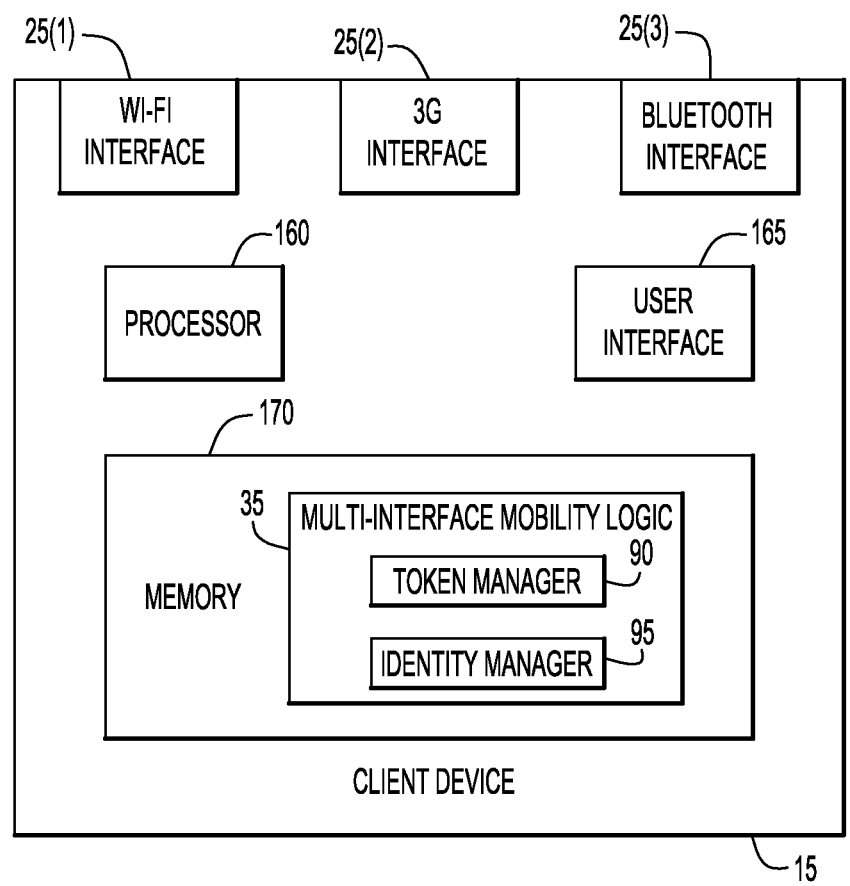
FIG. 3 is a block diagram of the client device configured to implement multiple-interface mobility techniques.

FIG. 3 is a block diagram illustrating further details of client device 15 configured to implement multi-interface mobility techniques described herein. As shown, client device 15 comprises three different types of wireless interfaces, including Wi-Fi interface 25(1), 3G interface 25(2), and Bluetooth interface 25(3). Client device 15 further comprises processor 160, user interface 165, and a memory 170. Memory 170 comprises multi-interface mobility logic 35 that includes token manager 90 and identity manager 95.

As noted above, client device 15 may be a computer (desktop, laptop, etc.,) or a mobile device (phone, tablet, etc.) that establishes a communication session with a cloud computing system 20. As such, user interface 165 may take many different forms and may include, for example, a keypad, keyboard, mouse, touchscreen, display screen, etc.

Memory 170 may comprise read only memory (ROM), random access memory (RAM), magnetic disk storage media devices, optical storage media devices, flash memory devices, electrical, optical, or other physical/tangible memory storage devices. The processor 160 is, for example, a microprocessor or microcontroller that executes instructions for the multi-interface mobility logic 35. Thus, in general, the memory 170 may comprise one or more tangible computer readable storage media (e.g., a memory device) encoded with software comprising computer executable instructions and when the software is executed (by the processor 160) it is operable to perform the operations described herein in connection with multi-interface mobility logic 35. More specifically, token manager 90 and identity manager 95 comprise software modules that, when executed by processor 160, provide the functionality described above with reference to FIG. 2.

FIG. 3 illustrates a software implementation of multi-interface mobility logic 35 (i.e., token manager 90 and identity manager 95). It is to be appreciated that this software implementation of FIG. 3 is merely illustrative, and that other implementations are possible. For example, in an alternative arrangement, multi-interface mobility logic 35 may be implemented fully or partially as hardware elements, such as digital logic gates in one or more application-specific integrated circuits (ASICS).

Figure 4:
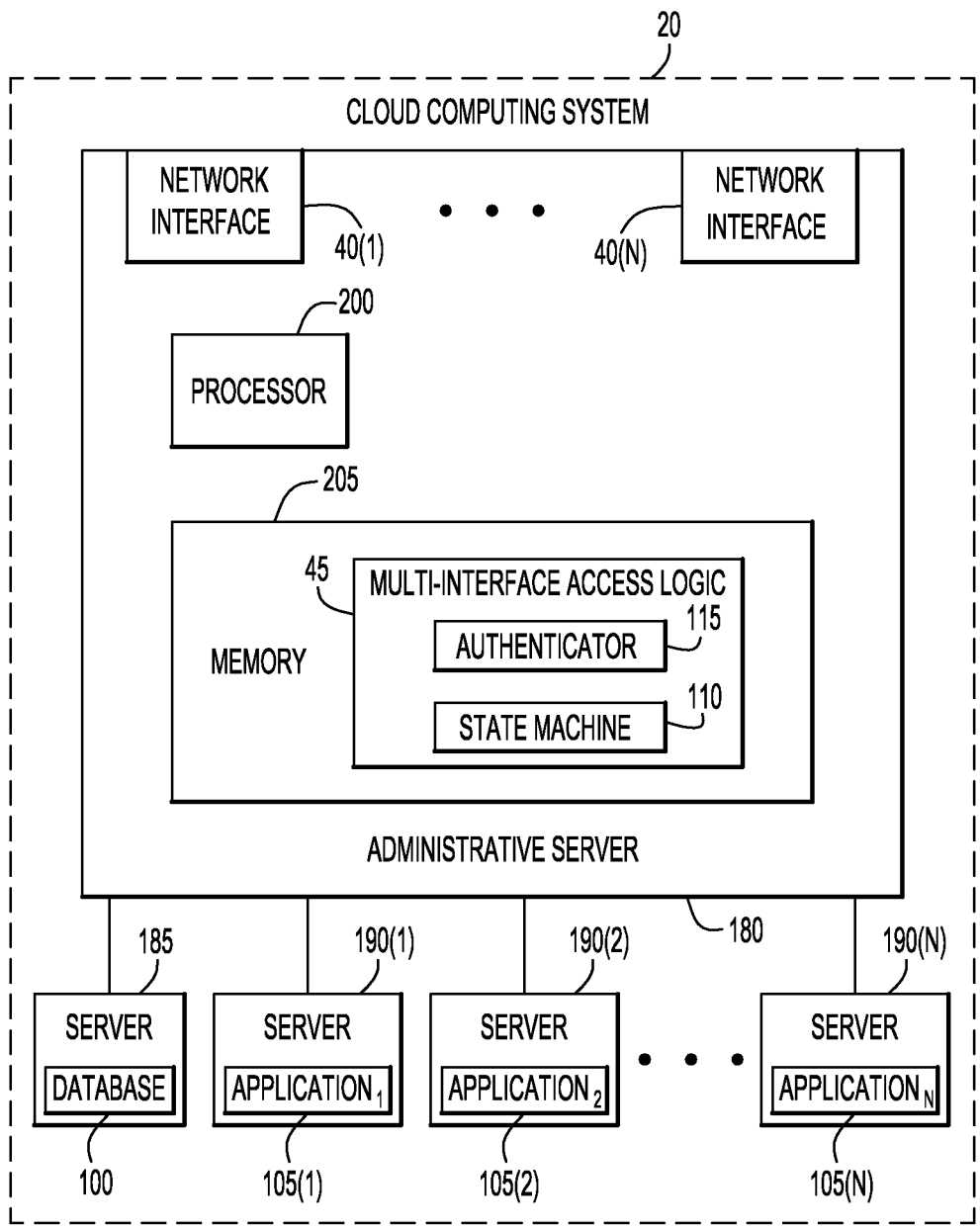
FIG. 4 is a block diagram of the cloud computing system configured to implement multiple-interface mobility techniques.

FIG. 4 is a block diagram illustrating further details of cloud computing system 20 configured to implement multi-interface mobility techniques described herein. As shown, cloud computing system comprises an administrative server 180, a database server 185, and a plurality of application servers 190(1)-190(N) connected by a high speed network, such as a local area network (LAN) or a wide area network (WAN). For ease of illustration, the interconnecting network, and associated networking devices, have been omitted from FIG. 4.

Administrative server 180 comprises a plurality of network interfaces 40(1)-40(N), a processor 200, and a memory 205 including multi-interface access logic 45. Multi-interface access logic 45 comprises authenticator 115 and state machine 110.

Database server 185 hosts database 100 implemented as described above with reference to FIG. 2. Application servers 190(1)-190(N) each host an application 105(1)-105(N), respectively, that may be accessed by client device 15 as described above.

Memory 205 may comprise read only memory (ROM), random access memory (RAM), magnetic disk storage media devices, optical storage media devices, flash memory devices, electrical, optical, or other physical/tangible memory storage devices. The processor 200 is, for example, a microprocessor or microcontroller that executes instructions for the multi-interface access logic 45. Thus, in general, the memory 205 may comprise one or more tangible computer readable storage media (e.g., a memory device) encoded with software comprising computer executable instructions and when the software is executed (by the processor 200) it is operable to perform the operations described herein in connection with multi-interface access logic 45. More specifically, authenticator 115 and state machine 110 comprise software modules that, when executed by processor 200, provide the functionality described above with reference to FIG. 2.

FIG. 4 illustrates a software implementation of multi-interface access logic 45 (i.e., authenticator 115 and state machine 110). It is to be appreciated that this software implementation of FIG. 4 is merely illustrative, and that other implementations are possible. For example, in an alternative arrangement, multi-interface access logic 45 may be implemented fully or partially as hardware elements, such as digital logic gates in one or more application-specific integrated circuits (ASICS).

Figure 5:
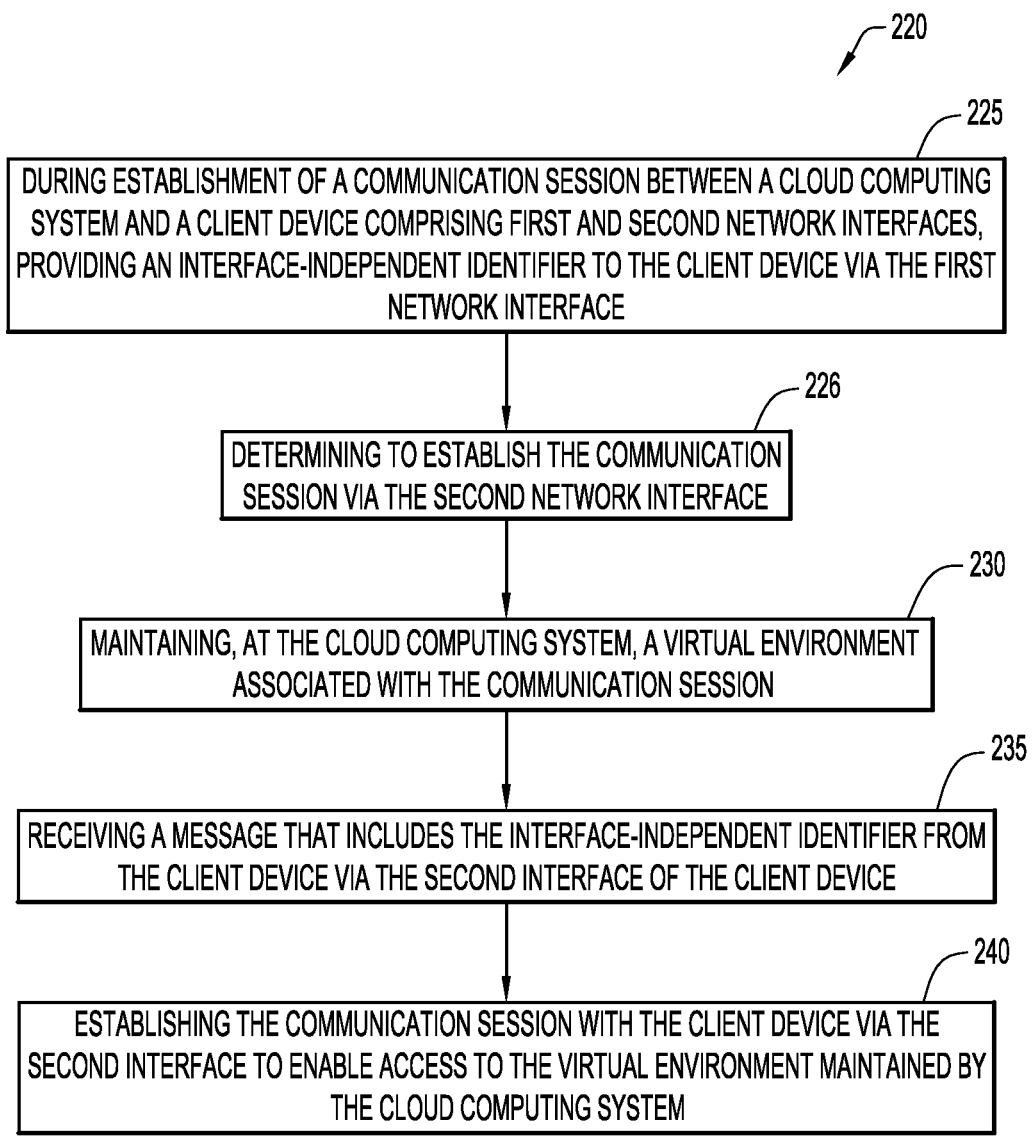
FIG. 5 is a flowchart of a method performed by a cloud computing system to provide multi-interface mobility access to cloud services.

FIG. 5 is a flowchart of a method 220 performed by a cloud computing system, such as cloud computing system 20, in accordance with an example multi-interface mobility technique. Method 220 begins at 225 where, during establishment of a communication session between a cloud computing system and a client device comprising first and second network interfaces, an interface-independent identifier is provided to the client device via the first network interface. At 226, a determination is made to establish the communication session via the second network interface. At 230, a virtual environment associated with the communication session is maintained at the cloud computing system (for a period of time) in order to provide persistent access to cloud services independent of network interface connection status. At 235, a message that includes the interface-independent identifier is received from the client device via the second interface of the client device and, at 240, the communication session with the client device is established (i.e., the same communication session is accessed) via the second interface to enable access to the virtual environment maintained by the cloud computing system using the same communication session.

Figure 6:
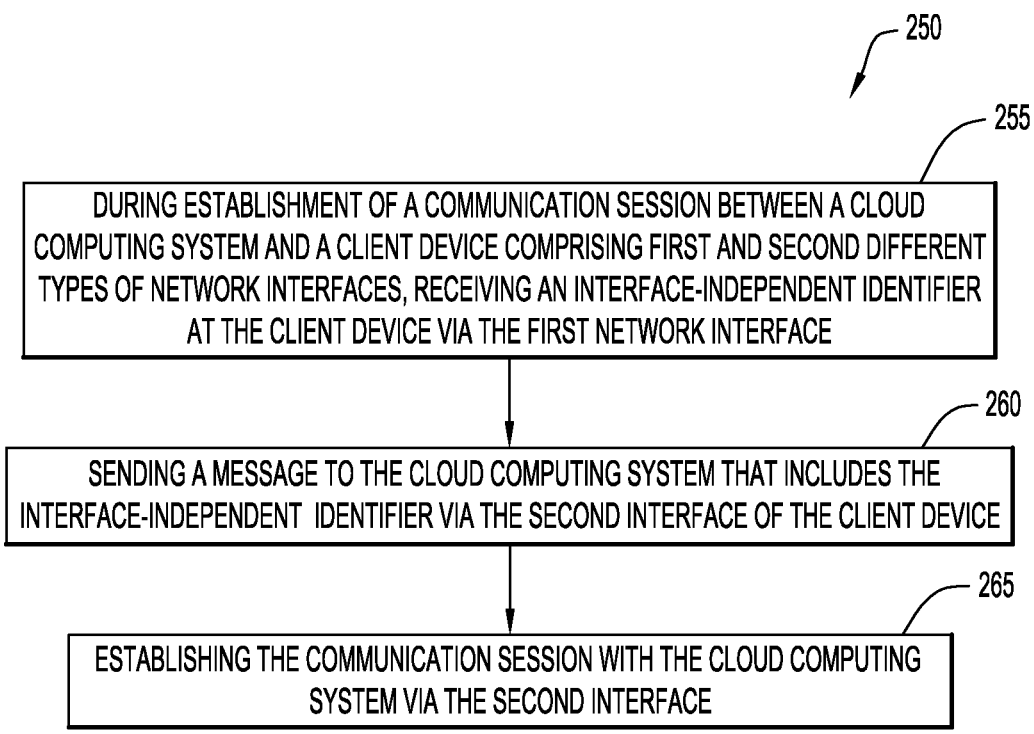
FIG. 6 is a flowchart of a method performed by a client device for multi-interface mobility access to cloud services.

FIG. 6 is a flowchart of a method 250 performed by a client device, such as client device 15, in accordance with an example multi-interface mobility technique. Method 250 begins at 255 where, during establishment of a communication session between a cloud computing system and a client device comprising first and second different types of network interfaces, an interface-independent identifier is received at the client device via the first network interface. At 260, a message that includes the interface-independent identifier is sent to the cloud computing system via the second interface of the client device. At 265, the communication session is established with the cloud computing system via the second interface.

The multi-interface mobility techniques described herein enable functional survival across interfaces and fast re-authentication following interface switchover. More specifically, the multi-interface mobility techniques allow a device with multiple interfaces to use all available resources for sending and retrieving data. For a device with multiple slow interfaces, this results in increased aggregate bandwidth. Additionally, the multi-interface mobility techniques allow communication session mobility as a device with multiple interfaces activates/deactivates associates/disassociates from multiple networks. Furthermore, the multi-interface mobility techniques enable the cloud domain to quickly associate/authenticate communication sessions.

The above description is intended by way of example only.

What is claimed is:

1. A method comprising:
    establishing, between a cloud computing system and a client device, an authenticated communication session via a first network interface of the client device, wherein the first network interface has associated therewith first network-layer interface information including a first Internet Protocol (IP) address;
    providing from the cloud computing system to the client device via the first network interface an interface-independent identifier associated with the authenticated communication session, wherein the interface-independent identifier is independent of the first network-layer interface information associated with the first network interface;
    determining to switch the authenticated communication session from the first network interface to a second network interface of the client device based on detecting a loss of connectivity or a data rate falling below a threshold at the first network interface, a communication session having been initiated with the client device over the second network interface, and the second network interface having associated therewith second network-layer interface information including a second IP address that is different from the first network-layer interface information;
    following determination to switch the authenticated communication session to the second network interface, maintaining, at the cloud computing system, a virtual environment associated with the authenticated communication session;
    receiving a message that includes the interface-independent identifier from the client device via the second network interface of the client device;
    validating, in response to receiving the interface-independent identifier in the message, the interface-independent identifier with the stored interface-independent identifier that was provided to the client device; and
    changing, in response to a successful validation of the interface-independent identifier, establishment of the authenticated communication session with the client device to be via the second network interface without additional user input, so that the same virtual environment, maintained by the cloud computing system, is accessed by the second network interface and the authenticated communication session continues via the second network interface after the changing.

2. The method of claim 1, wherein changing establishment of the authenticated communication session to be via the second network interface comprises:
    changing establishment of the authenticated communication session to be via the second network interface without additional authentication of the client device or a user of the client device via the second network interface.

3. The method of claim 1, further comprising:
    authenticating a user of the client device via the first network interface prior to changing establishment of the authenticated communication session to be via the second network interface.

4. The method of claim 3, wherein authenticating the user comprises:
    receiving from the user a username and password prior to changing establishment of the authenticated communication session to be via the second network interface.

5. The method of claim 1, wherein the interface-independent identifier is configured to time-out after a period of time, and wherein validating the received interface-independent identifier comprises:
    confirming that the period of time has not expired.

6. The method of claim 1, wherein determining to switch the authenticated communication session to be via the second network interface comprises:
    receiving the message via the second network interface of the client device that includes the interface-independent identifier, and wherein the method further comprises:
    expanding the authenticated communication session with the client device to include the second network interface so that data traffic resulting from the authenticated communication session is shared over the first and second network interfaces in response to the determination that there is no loss of connectivity at the first network interface.

7. The method of claim 1, wherein changing establishment further comprises changing establishment of the authenticated communication session to the second network interface without relying upon an Internet Protocol (IP) address.

8. A method comprising:
    establishing an authenticated communication session between a client device and a cloud computing system, the client device comprising a first network interface that is substantially different from a second network interface and the cloud computing system providing a virtual environment for access during the authenticated communication session, the authenticated communication session being established via the first network interface of the client device and having associated therewith first network-layer interface information including a first Internet Protocol (IP) address;
    receiving from the cloud computing system at the client device via the first network interface an interface-independent identifier associated with the authenticated communication session, the interface-independent identifier being independent of the first network-layer interface information associated with the first network interface;
    determining to switch the authenticated communication session from the first network interface to a second network interface of the client device, based on detecting a loss of connectivity or a data rate falling below a threshold at the first network interface, a communication session having been initiated with the cloud computing system over the second network interface, and the second network interface having associated therewith second network-layer interface information including a second IP address that is different from the first network-layer interface information;

sending, via the second network interface of the client device, a message to the cloud computing system that includes the interface-independent identifier;

receiving a validation result, wherein the cloud computing system validates the received interface-independent identifier with the stored interface-independent identifier that was provided to the client device;

changing, in response to receiving a successful validation result of the interface-independent identifier, establishment of the authenticated communication session with the cloud computing system to be via the second network interface without additional user input, so that the same virtual environment, maintained by the cloud computing system, is accessed by the second network interface and the authenticated communication session continues via the second network interface, after the changing.

9. The method of claim 8, further comprising:
providing authentication information to the cloud computing system via the second network interface prior to changing the establishment of the authenticated communication session with the cloud computing system to be via the second network interface.

10. The method of claim 8, further comprising:
during changing the establishment of the authenticated communication session between the cloud computing system and the client device, sending an indication, via the first network interface, to the cloud computing system that the client device has the second network interface and that the second network interface has connectivity.

11. The method of claim 8, further comprising:
sending a message, via the second network interface of the client device, to the cloud computing system that includes the interface-independent identifier; and
expanding the authenticated communication session with the cloud computing system to include the second network interface so that data traffic resulting from the authenticated communication session is shared over the first and second network interfaces in response to the determination that there is no loss of connectivity at the first network interface.

12. One or more non-transitory computer readable storage media encoded with software comprising computer executable instructions and when the software is executed by a processor causes the processor to:
establish, between a cloud computing system and a client device, an authenticated communication session via a first network interface of the client device, wherein the first network interface has associated therewith first network-layer interface information including a first Internet Protocol (IP) address;
provide from the cloud computing system to the client device via the first network interface an interface-independent identifier associated with the authenticated communication session, wherein the interface-independent identifier is independent of the first network-layer interface information associated with the first network interface;
determine to switch the authenticated communication session from the first network interface to a second network interface of the client device, based on detecting a loss of connectivity or a data rate falling below a threshold at the first network interface, a communication session having been initiated with the client device over the second network interface, and the second network interface having associated therewith second network-layer interface information including a second IP address that is different from the first network-layer interface information;

maintain at the cloud computing system a virtual environment associated with the authenticated communication session;

receive a message that includes the interface-independent identifier from the client device via the second network interface of the client device;

validate, in response to receiving the interface-independent identifier in the message, the interface-independent identifier with the stored interface-independent identifier that was provided to the client device; and change, in response to a successful validation of the interface-independent identifier, establishment of the authenticated communication session with the client device to be via the second network interface without additional user input, so that the same virtual environment, maintained by the cloud computing system, is accessed by the second network interface and the authenticated communication session continues via the second network interface after the authenticated communication session is changed to the second network interface.

13. The non-transitory computer readable storage media of claim 12, wherein the instructions to establish the authenticated communication session comprise instructions which cause the processor to:
change establishment of the authenticated communication session to be via the second network interface without additional authentication of the client device or a user of the client device via the second network interface.

14. The non-transitory computer readable storage media of claim 12, further comprising instructions which cause the processor to:
authenticate a user of the client device via the first network interface prior to changing establishment of the authenticated communication session to be via the second network interface.

15. The non-transitory computer readable storage media of claim 14, wherein the instructions operable to authenticate the user comprise instructions which cause the processor to:
receive from the user a username and password prior to changing establishment of the authenticated communication session to be via the second network interface.

16. The non-transitory computer readable storage media of claim 12, wherein the interface-independent identifier is configured to time-out after a period of time, and wherein the instructions to validate the received interface-independent identifier comprise instructions which cause the processor to:
confirm that the period of time has not expired.

17. The non-transitory computer readable storage media of claim 12, wherein the instructions to determine to switch interfaces for the authenticated communication session to be via the second network interface further comprise instructions which cause the processor to:
receive a message via the second network interface of the client device that includes the interface-independent identifier, and further comprising to expand the authenticated communication session with the client device to include the second network interface so that data traffic resulting from the authenticated communication session is shared over the first and second network interfaces in response to a determination that there is no loss of connectivity at the first network interface.

18. A system comprising:
a network interface device that enables communication over a network;
one or more servers, comprising one or more hardware processors, hosting cloud services, each server is configured to:
- establish, between a cloud computing system and a client device, an authenticated communication session via a first network interface of the client device, wherein the first network interface has associated therewith first network- layer interface information including a first Internet Protocol (IP) address;
- provide to the client device via the first network interface of the client device an interface-independent identifier associated with the authenticated communication session, wherein the interface-independent identifier is independent of the first network-layer interface information associated with the first network interface;
- determine to switch the authenticated communication session to be via a second network interface, based on detecting a loss of connectivity or a data rate falling below a threshold at the first network interface, a communication session having been initiated with the client device over the second network interface, and the second network interface having associated therewith second network-layer interface information including a second IP address that is different from the first network-layer interface information;
- maintain at the cloud computing system a virtual environment associated with the authenticated communication session;
- receive a message that includes the interface-independent identifier from the client device via the second network interface of the client device;
- validate, in response to receiving the interface-independent identifier in the message, the interface-independent identifier with the stored interface-independent identifier that was provided to the client device; and
- change, in response to a successful validation of the interface-independent identifier, establishment of the authenticated communication session with the client device to be via the second network interface without additional user input, so that the same virtual environment, maintained by the cloud computing system, is accessed by the second network interface and the authenticated communication session continues via the second network interface after the authenticated communication session is changed to the second network interface.

19. The system of claim 18, wherein the processor is configured to change the establishment of the authenticated communication session to be via the second network interface without additional authentication of the client device or a user of the client device via the second network interface.

20. The system of claim 18, wherein the processor is configured to authenticate a user of the client device via the first network interface prior to changing the establishment of the authenticated communication session to be via the second network interface.

21. The system of claim 20, wherein the processor is configured to receive from the user a username and password prior to changing the establishment of the authenticated communication session to be via the second network interface.

22. The system of claim 18, the processor is configured to generate the interface-independent identifier so as to time-out after a period of time, and wherein the processor is configured to confirm that the period of time has not expired.

23. The system of claim 18, wherein to determine to switch interfaces for the authenticated communication session to be via the second network interface, the processor is configured to receive a message via the second network interface of the client device that includes the interface-independent identifier, and the processor is configured to expand the authenticated communication session with the client device to include the second network interface so that traffic resulting from the authenticated communication session is shared over the first and second network interfaces in response to the determination that there is no loss of connectivity at the first network interface.

* * * * *